United States Patent

[11] 3,603,054

| [72] | Inventor | Yves Didry<br>44 Avenue Paul Vaillant, Montreuil Sous Bois, France |
|---|---|---|
| [21] | Appl. No. | 770,204 |
| [22] | Filed | Oct. 24, 1968 |
| [45] | Patented | Sept. 7, 1971 |
| [32] | Priority | Oct. 26, 1967 |
| [33] | | France |
| [31] | | 126,020 |

[54] NOVEL RECTANGULAR CROSS SECTION MEMBER HAVING TWO PERPENDICULAR ENTRY CHANNELS
3 Claims, 10 Drawing Figs.

[52] U.S. Cl. .................................................. 52/282,
    52/280, 52/495, 52/738
[51] Int. Cl. ..................................................... E04b 2/58,
    E04b 2/82
[50] Field of Search .......................................... 52/280,
    282, 495, 738

[56] References Cited
UNITED STATES PATENTS

| 157,399 | 12/1874 | Holmes .................... | 52/282 |
| 3,206,806 | 9/1965 | Powell ...................... | 52/280 X |
| 3,456,409 | 7/1969 | Piget ........................ | 52/282 |
| FOREIGN PATENTS | | | |
| 1,071,700 | 6/1967 | Great Britain .............. | 52/280 |

Primary Examiner—Alfred C. Perham
Attorney—Sughrue, Rothwell, Mion, Zinn & Macpeak ABSTRACT: A plurality of panels may be assembled in a mutually perpendicular relationship so as to have their adjacent cooperating outer peripheral portions flush to one another by means of assembling the panels within channeled joining members. The joining members include integral angled portions defining two channels having their entrances arranged substantially perpendicular to one another. The angled portions form an angled outer wall and an inner flange where the flange includes overhanging lip portions which partially obstruct the entrances to the channels. The channel entrance obstructions are arranged only on the internal flange so as to allow the panels to be arranged flush with one another when they are assembled in mutually perpendicular planes.

PATENTED SEP 7 1971　　3,603,054
SHEET 1 OF 4
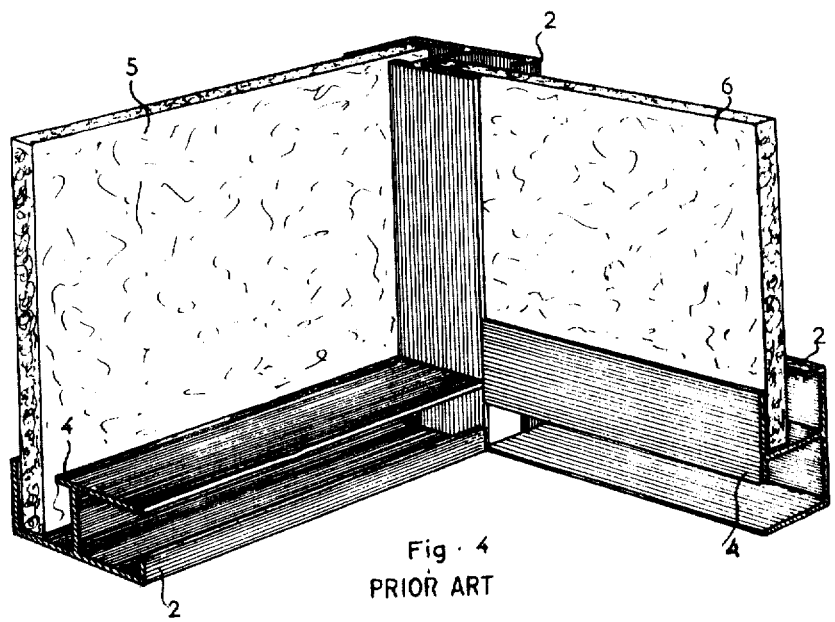
Fig. 4
PRIOR ART
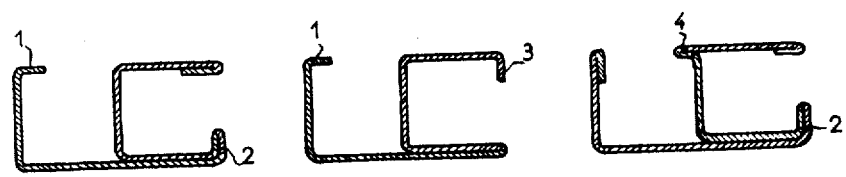
Fig. 3
PRIOR ART
Fig. 2
PRIOR ART
Fig. 1
PRIOR ART

NOVEL RECTANGULAR CROSS SECTION MEMBER HAVING TWO PERPENDICULAR ENTRY CHANNELS

Rectangular cross section members having two channels which are usually of the same volume and whose perpendicular entries are partly closed are known, one entry is closed by an edge lip on the outer periphery and the other entry is closed by an edge lip on the inner periphery, or else both are closed by an edge lip on the outer periphery. The presence of at least one edge lip on the outer periphery has the following disadvantages:

Not even one of the panelling members can be placed flush with the section member outer periphery;

When two of such section members are used, it is impossible, in the case of assembly in three planes perpendicular to one another, to introduce a third panelling unit to bound an enclosed volume, and Securing clips engaging the panelling units with the section members cannot be positioned on the same side as the constructed enclosure but must be positioned from inside or outside the enclosure.

The invention relates to a novel rectangular cross section section member comprising, like the three section members of a known kind, two channels having perpendicular entries but with the main difference from the three section members of known kind that the two bent edges which partially close the channel entries are both on the inner periphery, so that the three disadvantages just described are obviated and panelling units can be placed flush with the section member outer surfaces, so that enclosures can be devised and clips for securing the panelling units to the section members can be introduced from inside the enclosure.

The section member is embodied either from extruded light alloy or plastics or from rolled steel.

Details of the invention will be disclosed in a further description, reference being made to the accompanying drawings wherein:

FIGS. 1, 2, 3 are cross sections through three rectangular cross section section members having two perpendicular-entry channels of known kinds;

FIG. 4 is a perspective view showing section-member elements of the kind shown in FIG. 1 assembled in three planes perpendicular to one another;

Figure 10:
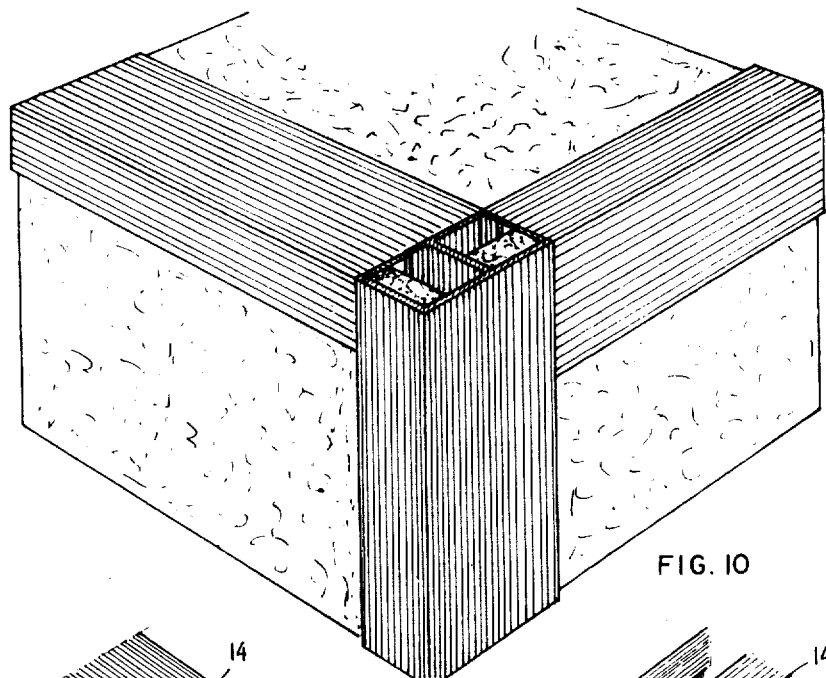
Figure 9:
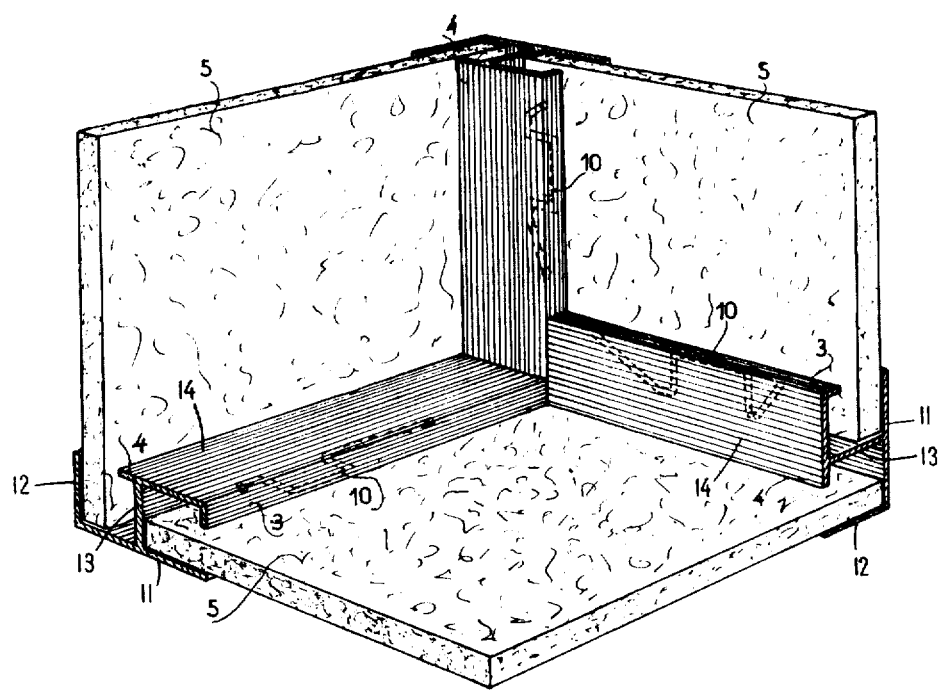

FIG. 9 is a perspective view showing from the inside one of the four apexes of the base of a rectangular prism formed by three section-member elements according to the invention assembled in three planes perpendicular to one another with the use of three panelling units which are applied to the outer periphery of such elements and secured by clipping, and FIG. 10 is a perspective external view showing one of the four apexes of the top surface of a rectangular prism embodied by three section-member elements according to the invention, as in FIG. 9.

Referring to FIGS. 1-3, a section member has edge lips 1, 2 which are disposed on the outer periphery and which partly close the entries of two channels; the section members also have edge lips 3, 4 on the inner periphery.

FIG. 4 shows an assembly, in three planes perpendicular to one another, of three known section-member elements of the kind shown in FIG. 1, with the introduction of panelling unit 5 flush with the outer periphery of the two elements which is assembles, and with the introduction of a panelling unit 6 which cannot be flush with the outer periphery of the two elements which it assembles. Clearly, the presence of the lip 2 prevents the introduction of a third (horizontal) panelling unit. Also, although the clips (not shown) for the panel 5 can be introduced from inside the space the clips (not shown) for the panel 6 must be introduced from outside the space.

Figure 5:
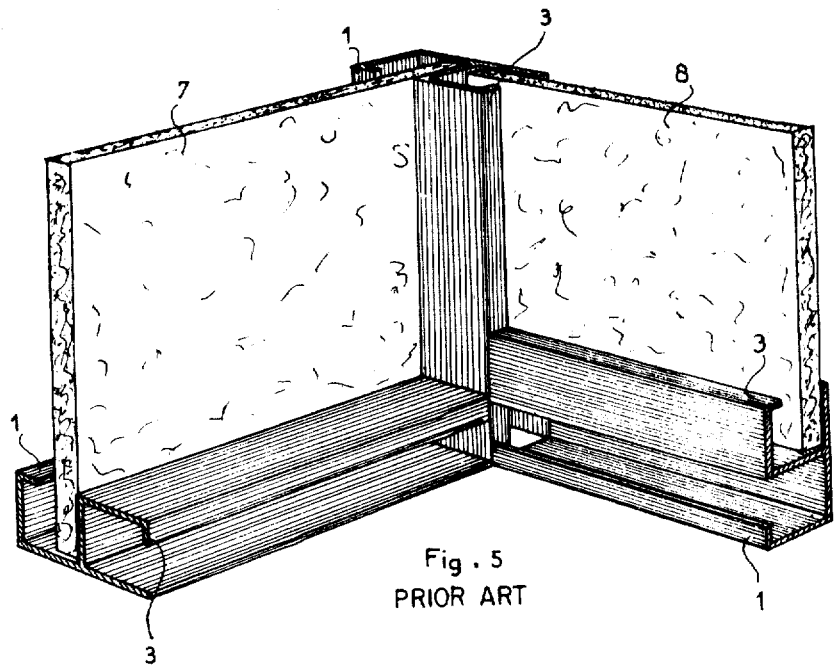
FIG. 5 is a perspective view showing section-member elements of the kind shown in FIG. 2 assembled in three planes perpendicular to one another.

FIG. 5 shows an assembly, in three planes perpendicular to one another, of three elements of the known section member shown in FIG. 2, with the introduction of a panelling unit 7, which cannot be flush with the outer periphery of the two section member elements which it assembles, and with the introduction of a panelling unit 8 which is flush with the outer periphery of the two section-member elements which it assembles; the presence of the lip 1 makes it impossible to introduce a third (horizontal) panelling unit. Also, the clip (not shown) for the unit 7 must be introduced from outside the space, although the clip for fixing the unit 8 can be introduced from inside the space.

Figure 6:
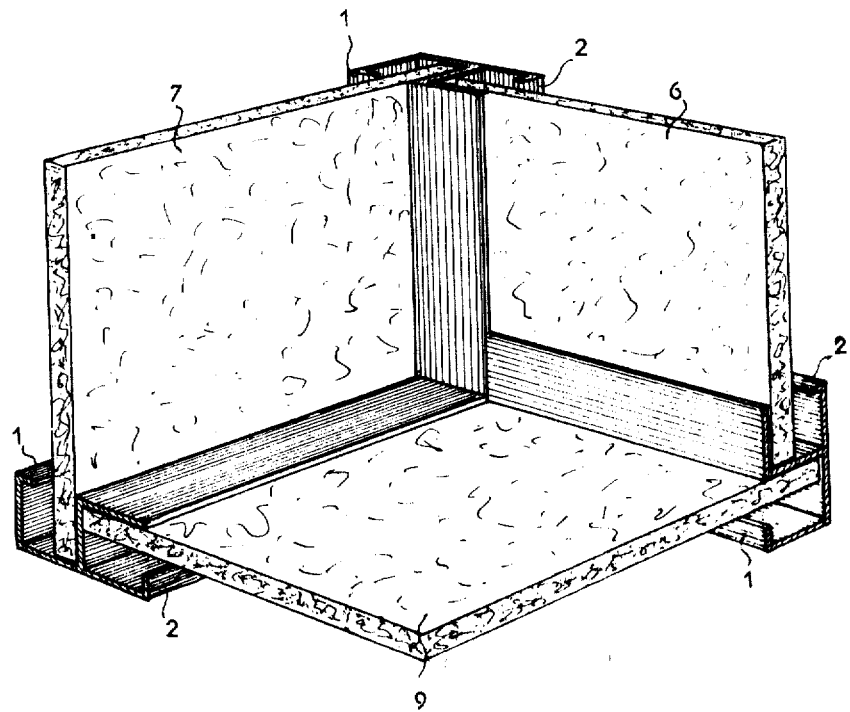
FIG. 6 is a perspective view showing section-member elements of the kind shown in FIG. 3 assembled in three planes perpendicular to one another.

Referring to FIG. 6 three section-member elements of the kind shown in FIG. 3 are assembled in three planes perpendicular to one another, with the introduction of a panelling unit 7, which cannot be flush with the outer periphery of the two elements which it assembles, and with the introduction of a panelling unit 6, which cannot be flush with the outer periphery of the two elements which it assembles, and with a possibility of introducing a horizontal panelling unit 9, although the same cannot be flush with the outer periphery of the two elements which it assembles.

The clips (not shown) for securing all three panelling units must be positioned from outside the space.

Figure 7:
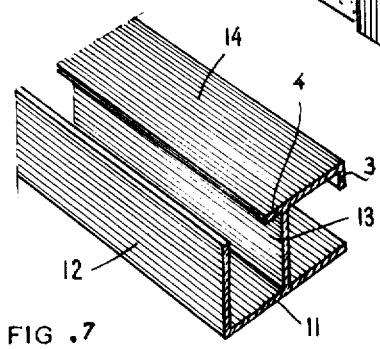
FIG. 7 is a perspective view of an extruded section member according to the invention.
Figure 8:
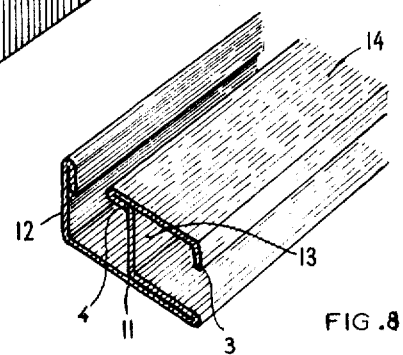
FIG. 8 is a perspective view of a rolled-steel section member according to the invention.

The structure of the panel-joining member according to the present invention has an outer angled portion formed by joining two plane walls 11 and 12 along one edge thereof at right angles with each other, as shown in FIGS. 7 and 8. An inner angled portion is formed by two additional walls 13 and 14 joined at right angles with each other. One of the walls 13 of the inner angled portion is attached to one of the walls 11 of the outer angled portion on the inner surface and along the length thereof, in such a manner as to form two channels having their entrances perpendicular to each other. These channels are formed by the wall portions 11, 12, 13 and 14, as shown in FIGS. 7 and 8.

The two rigid edge lips 3 and 4 are formed as part of the inner angled portion made up of plane walls 13 and 14. As may be seen in FIGS. 7 and 8, one of the rigid edge lips 4 is joined to the inner angled portion at the intersection of the plane walls 13 and 14 and extends perpendicularly from the plane 13 into the channel formed by the walls 11, 12, and 13. The rigid edge lip 4 may be a continuation of the plane wall 14 and is parallel to the outer plane wall 11. A second rigid edge lip 3 is formed at the unattached end of the plane wall 14 which forms a part of the inner angled portion and extends perpendicularly therefrom into the channel formed by the wall 11 of the outer angled portion and the walls 13 and 14 of the inner angled portion.

By placing the rigid edge lips of flanges 3 and 4 on the walls 13 and 14 of the inner angled portion, rather than on the walls 11 and 12 of the outer angled portion, the panels to be joined may be positioned so that their exterior surfaces are adjacent the outer walls 11 and 12 of the panel joining member, whereby the spring clips 10 may be inserted into the channels from the same sides.

The section member according to the invention, shown in its extruded light-alloy form in FIG. 7 and in its rolled-steel form in FIG. 8, has its two edge lips 3, 4 on the inner periphery.

Referring to FIGS. 9 and 10, three elements of the section member according to the invention are shown assembled in three planes perpendicular to one another, with the introduction of three panelling units 5 flush with the outer periphery of the elements which they assemble, and with fixing clips 10 introduced from the inside the space. Consequently, the section member according to the invention obviates the three disadvantages of the three kinds of know section member.

I claim:

1. In combination, a panel assembly comprising, panel-joining members having an outer angled portion formed by two plane walls joined together at right angles with each other at the edges thereof and an inner angled portion formed by two plane walls joined at right angles with each other at the edges thereof, a panel joining member having an outer angled portion formed by two plane walls joined together at right angles with each other at the edges thereof and an inner angled portion formed by two plane walls joined at right angles to each other at the edges thereof, one said wall of said inner angled portion being rigidly attached at right angles with the inner surface of one wall of said outer angled portion and in spaced relationship with the remaining wall thereof, the unattached end of the remaining wall of said inner angled portion extending in a direction opposite said remaining wall of said outer angled portion and parallel to said one wall of said outer angled portion, said walls of said inner and outer angled portions defining two entry channels having their entrances disposed substantially perpendicular to each other, two rigid edge lips attached to said inner angled portion and extending perpendicular into each of said channels, one of said rigid edge lips formed at the intersection of the two plane walls forming said inner angled portion and extending perpendicularly from said one wall of said inner angled portion and said other rigid edge lip being formed at the unattached end of said remaining wall forming said inner angled portion, panels having their edge portions inserted within the channels of the joining members formed by the angled portions thereof, and at least one resilient clip mounted between the walls of the inner angled portion of said joining member and the inner surface of the panels so as to urge said panel into secure assembled position against the joining member.

2. A panel assembly as claimed in claim 1, wherein said joining member is of one piece construction and made from a metallic material by extrusion.

3. A panel assembly as claimed in claim 1, wherein said joining member is made from a one-piece sheet of metallic material by bending said sheet to form said joining member.